(12) United States Patent
Kim et al.

(10) Patent No.: US 12,418,065 B2
(45) Date of Patent: Sep. 16, 2025

(54) BATTERY MODULE

(71) Applicant: SK On Co., Ltd., Seoul (KR)

(72) Inventors: Suk Chul Kim, Daejeon (KR); Yong Uk Kim, Daejeon (KR); Yun Hee Kim, Daejeon (KR); Byung Jun Park, Daejeon (KR); Jong Ho Seok, Daejeon (KR); Tae Hyun Chang, Daejeon (KR); Dong Hwa Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 414 days.

(21) Appl. No.: 17/667,749

(22) Filed: Feb. 9, 2022

(65) Prior Publication Data

US 2022/0271372 A1 Aug. 25, 2022

(30) Foreign Application Priority Data

Feb. 19, 2021 (KR) .................. 10-2021-0022288

(51) Int. Cl.
*H01M 50/102* (2021.01)
*H01M 10/613* (2014.01)
*H01M 10/6551* (2014.01)
*H01M 50/119* (2021.01)

(52) U.S. Cl.
CPC ....... *H01M 50/102* (2021.01); *H01M 10/613* (2015.04); *H01M 10/6551* (2015.04); *H01M 50/119* (2021.01)

(58) Field of Classification Search
CPC ............ H01M 50/102; H01M 50/119; H01M 10/613; H01M 10/6551; H01M 50/00–298
See application file for complete search history.

(56) References Cited

U.S. PATENT DOCUMENTS

| | | | |
|---|---|---|---|
| 2010/0167115 A1* | 7/2010 | Okada | H01M 50/24 429/99 |
| 2012/0003520 A1* | 1/2012 | Lee | H01M 50/211 429/83 |
| 2013/0004822 A1* | 1/2013 | Hashimoto | H01M 10/6554 429/120 |

(Continued)

FOREIGN PATENT DOCUMENTS

| | | |
|---|---|---|
| EP | 2659534 B1 | 12/2016 |
| GB | 2535546 A | 8/2016 |

(Continued)

OTHER PUBLICATIONS

Extended European Search Report for the European Patent Application No. 22157137.5 issued by the European Patent Office on Jul. 5, 2022.

(Continued)

*Primary Examiner* — Haroon S. Sheikh
(74) *Attorney, Agent, or Firm* — IP & T GROUP LLP

(57) ABSTRACT

A battery module includes a battery sub-module including a cell support member, at least one battery cell accommodated in the cell support member, and a case provided to partially surround the at least one battery cell, and a first barrier disposed on a first side of the battery sub-module, wherein the at least one battery cell is enclosed and sealed by the cell support member and the case, and the first barrier includes a first protrusion configured to press a part of the case inwardly of the battery sub-module.

17 Claims, 13 Drawing Sheets

(56) References Cited

U.S. PATENT DOCUMENTS

| | | | |
|---|---|---|---|
| 2013/0224524 A1* | 8/2013 | Nam | H01M 50/211 |
| | | | 429/7 |
| 2013/0280596 A1 | 10/2013 | Lee et al. | |
| 2016/0218337 A1* | 7/2016 | Morisaku | H01M 50/367 |
| 2018/0026296 A1 | 1/2018 | Kruger et al. | |
| 2018/0138560 A1* | 5/2018 | Bessho | H01M 10/6555 |
| 2020/0194750 A1* | 6/2020 | Kawano | H01M 50/209 |
| 2021/0257697 A1* | 8/2021 | Nishimura | H01M 10/647 |
| 2021/0320374 A1 | 10/2021 | Lee et al. | |
| 2022/0247029 A1* | 8/2022 | Takahashi | H01M 10/441 |

FOREIGN PATENT DOCUMENTS

| | | |
|---|---|---|
| JP | 2010-157450 A | 7/2010 |
| KR | 10-2012-0077635 A | 7/2012 |
| KR | 10-2020-0104620 A | 9/2020 |
| KR | 10-2020-0107213 A | 9/2020 |
| WO | 2020/204901 A1 | 10/2020 |

OTHER PUBLICATIONS

Office Action for Korean Patent Application No. 10-2021-0022288 issued by the Korean Intellectual Property Office (KIPO) on May 19, 2025.

* cited by examiner

BATTERY MODULE

CROSS-REFERENCE TO RELATED APPLICATION(S)

This application claims benefit of priority to Korean Patent Application No. 10-2021-0022288 filed on Feb. 19, 2021 in the Korean Intellectual Property Office, the disclosure of which is incorporated herein by reference in its entirety.

BACKGROUND

1. Field

The present disclosure relates to a battery module, and more particularly, to a structure for improving sealing properties of a battery module provided in a battery module.

2. Description of Related Art

As technological development and demand for mobile devices, electric vehicles, and energy storage systems (ESS) have increased, demand for secondary battery cells as an energy source has rapidly increased. Secondary battery cells are batteries capable of repeated charging and discharging because mutual conversion between chemical energy and electrical energy is reversible.

A secondary battery cell includes an electrode assembly such as a positive electrode, a negative electrode, a separator, and an electrolyte, which are main components of a secondary battery and a cell body member of a laminated film case protecting the electrode assembly.

However, such an electrode assembly generates heat while undergoing charging and discharging, and a temperature rise due to heat generation deteriorates performance of a secondary battery cell. In addition, when such heat generation is severe, an internal pressure of the secondary battery cell rises, causing an issue in that the secondary battery cell can be ignited.

Moreover, when a plurality of secondary battery cells are mounted together with an energy storage system (ESS), the secondary battery cell may explode along with such ignition, and a flame may propagate to other secondary battery cells in the vicinity.

SUMMARY

Embodiments of the present disclosure provide a battery sub-packing unit capable of reducing propagation of ignition of secondary battery cells, or preventing propagation of ignition of secondary battery cells, and/or shielding heat generated in one secondary battery cell from being transferred to another neighboring secondary battery cell, and a battery module including the same.

According to one aspect of the present disclosure, a battery module includes: a battery sub-module including a cell support member, at least one battery cell accommodated in the cell support member, and a case provided to partially surround the at least one battery cell; and a first barrier disposed on a first side of the battery sub-module, wherein the at least one battery cell is enclosed and sealed by the cell support member and the case, and the first barrier includes a first protrusion configured to press a part of the case inwardly of the battery sub-module.

An edge of the case may include a bent portion extending inwardly of the battery sub-module, and the first protrusion may be configured to press against the bent portion of the case.

The case may include an upper plate and side plates extending from both sides of the upper plate, the at least one battery cell may be disposed in a space defined by the upper plate and the side plates, and the bent portion of the case may extend from an edge of the side plate inwardly of the battery sub-module.

The first protrusion may extend along a corner portion of the case bent from the side plate to the bent portion and may be configured to press against the bent portion of the case along the corner portion.

The first protrusion may have a shape corresponding to a side portion of one of the side plates extending from the side plate to the bent portion.

The first protrusion may include a concave portion having a shape corresponding to a corner portion of the case folded from one of the side plates to the bent portion.

The side plates may extend in a length direction to surround the at least one battery cell from both sides of the upper plate, and the bent portion of the case may extend inwardly of the battery sub-module from an edge of one of the side plate in the length direction.

The side plates may extend in the length direction to surround the at least one battery cell from both sides of the upper plate, and the bent portion of the case may extend inwardly of the battery cell from an edge of one of the side plate in a width direction, which is perpendicular to the length direction.

The battery sub-module may include a cell support member accommodating the at least one battery cell, and the cell support member may include a recess partially accommodating the bent portion of the bent portion of the case.

The first protrusion may of the first barrier be partially accommodated in the recess.

The first barrier may include an air gap therein.

The first barrier may include at least one opening connected to the air gap on an outer surface thereof.

The first barrier may include a partition wall therein, the air gap may be provided inside the first barrier by the partition wall, and the partition wall may include an opening connecting both spaces divided by the partition wall.

The case may be configured to press the at least one battery cell from both sides when assembled to the at least one battery cell.

The battery module may further include a second barrier provided on the other side of the battery sub-module, having a wider width than the barrier, and including a second protrusion configured to press a portion of the case inwardly of the battery sub-module.

The thick barrier may include an air gap therein and at least one opening connected to the air gap on an outer surface thereof.

The cell support member may be provided in the form of a quadrangular frame surrounding an edge of the at least one battery cell, both surfaces of the at least one battery cell may be exposed an outside of the cell support member, and the case may be provided to surround both surfaces of the at least one battery cell.

The case may include a metal material to absorb heat generated by the at least one battery cell and dissipate the absorbed heat outside the battery sub-module.

According to another aspect of the present disclosure, a battery module includes: a battery sub-module including a cell support member, at least one battery cell accommodated in the cell support member, and a case provided to partially surround the at least one battery cell; and a first barrier and a second barrier having protrusions pressed against the case and the cell support member to hold the at least one battery cell in the batter sub-module, wherein a gap is formed between the case and at least one of the first barrier and the second barrier, and a gas passage is formed from the gap to an outer surface of the battery module.

The protrusions include peripheral protrusions pressing against bent portions of the case.

BRIEF DESCRIPTION OF DRAWINGS

The above and other aspects, embodiments, features, and advantages of the present disclosure will be more clearly understood from the following detailed description, taken in conjunction with the accompanying drawings, in which.

DETAILED DESCRIPTION

Hereinafter, the embodiments in the present disclosure will be described in detail with reference to the drawings. However, the technical aspects of the present disclosure are not limited to only the presented embodiments.

For example, those skilled in the art will recognize from the specification and drawings other embodiments included within the scope of the present disclosure through addition, change, or deletion of components, and recognize that those other embodiments are within the scope of the present disclosure.

Figure 1:
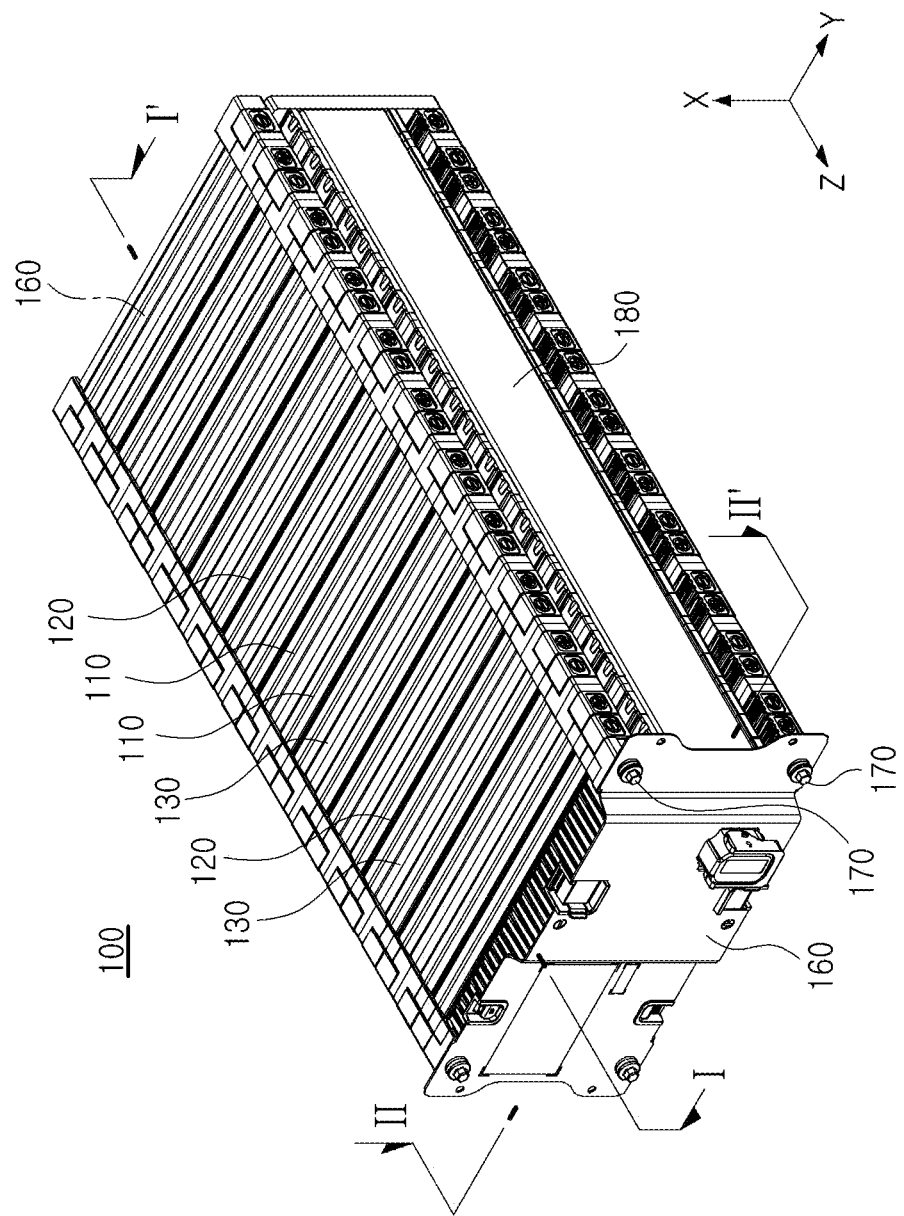
FIG. 1 is a perspective view of a battery module according to an exemplary embodiment.
Figure 2:
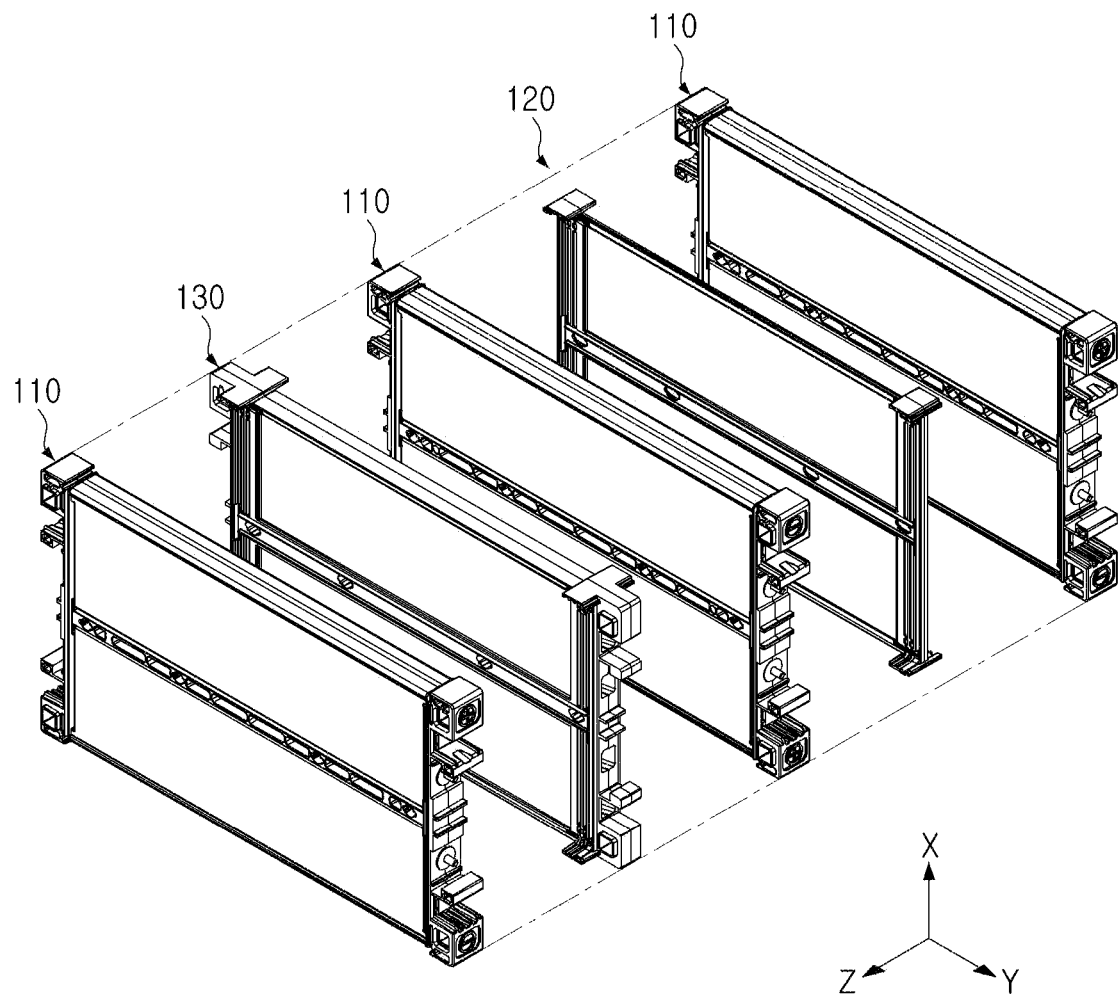
FIG. 2 is a partially exploded perspective view of a battery module according to an exemplary embodiment.

FIG. 1 is a perspective view of a battery module 100 according to an exemplary embodiment. FIG. 2 is a partially exploded perspective view of the battery module 100 according to an exemplary embodiment.

In one embodiment of the present disclosure, the battery module 100 may include a plurality of battery sub-modules 110 and structures grouping the plurality of battery sub-modules 110 as a pack. For example, the battery sub-modules 110 may be disposed between the two end plates 160 disposed to face each other.

In another embodiment, end plates 160 and the battery sub-modules 110 are fixed to each other by a connecting member 170 penetrating therethrough. By the connecting member 170 pressing the two end plates 160 in a direction toward each other, the battery sub-modules 110 may be in a state of being pressed in a stacking direction (e.g., illustrated in FIG. 1 as in the Z direction) to each other. In one embodiment, the end plates 160 may be fitted into both ends of the bar-shaped connecting member 170 extending in the stacking direction, respectively, and a nut may be coupled thereon. In a state in which the battery sub-modules 110 are disposed between the end plates 160, a distance between the end plates 160 may be narrowed by fastening nuts to both ends of the connecting member 170, which may press the battery sub-modules 110 in the stacking direction. By pressing both sides of the battery cell, gas occurring when the battery cell is charged may be removed and an electrolyte may be evenly spread on the electrode plate. This may improve the quality of the battery cells. In another embodiment, the battery module 100 may further include a sidewall cover member 180 surrounding side portions of the plurality of battery sub-modules 110.

In one embodiment, as shown in FIG. 2, the battery module 100 may include barriers 120 and 130 provided between the battery sub-modules 110. The barriers 120 and 130 may press a portion of the battery sub-modules 110 by the end plates 160. In another embodiment, the barriers 120 and 130 may include a pressing structure configured to press against specific portions of the battery sub-module 110. A pressing structure of the barriers 120 and 130 will be described in detail with reference to FIGS. 7 to 10.

In one embodiment, the battery module 100 may include different types of barriers 120 and 130. Referring to FIGS. 1 and 2, the first barrier 120 and the second barrier 130 may be alternately disposed between the battery sub-modules 110.

In another embodiment, the second barrier 130 may be thicker than the first barrier 120. In one example, the second barrier 130 may have a thickness of 25 mm or greater. The barriers 120 and 130 basically function to reduce heat conduction or heat radiation between the battery sub-modules 110, and the barriers 120 and 130 may perform such a function better when thicker. However, since an energy density of the battery module 100 decreases as the thickness of the barriers 120 and 130 increases, the second barrier 130 may have a thickness that does not excessively decrease efficiency.

In the embodiments illustrated in the drawings of the present disclosure, the first barrier 120 and the second barrier 130 are alternately disposed between the battery sub-modules 110, but the present disclosure is not limited thereto. In another embodiment, the second barrier 130 may be disposed after the first barrier 120 is consecutively disposed two or more times. For example, in a portion of the battery module 100, the first barrier 120, the battery sub-module 110, the first barrier 120, the battery sub-module 110, the second barrier 130, and the battery sub-module 110 may be arranged in sequence. In another embodiment, the first barrier 120 and the second barrier 130 may not always be periodically arranged in one battery module 100. That is, a pattern in which the first barrier 120 and the second barrier 130 are repeated in the stacking direction in the battery module 100 may not be uniform.

Figure 3:
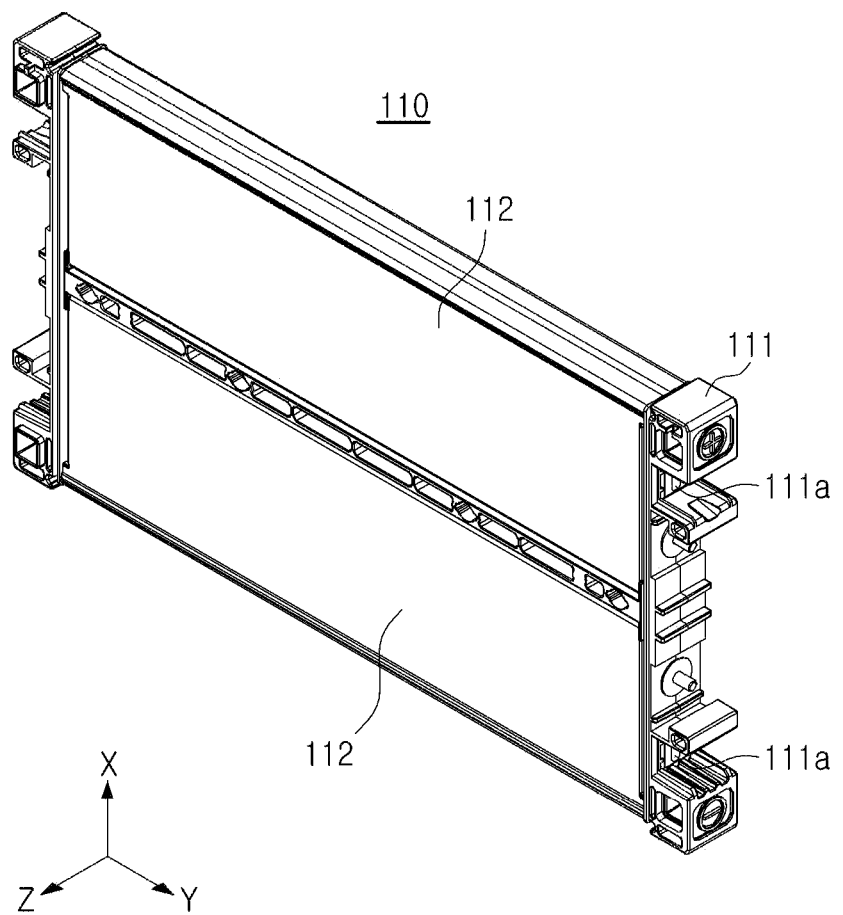
FIG. 3 is a perspective view of a battery sub-module according to an exemplary embodiment.
Figure 4:
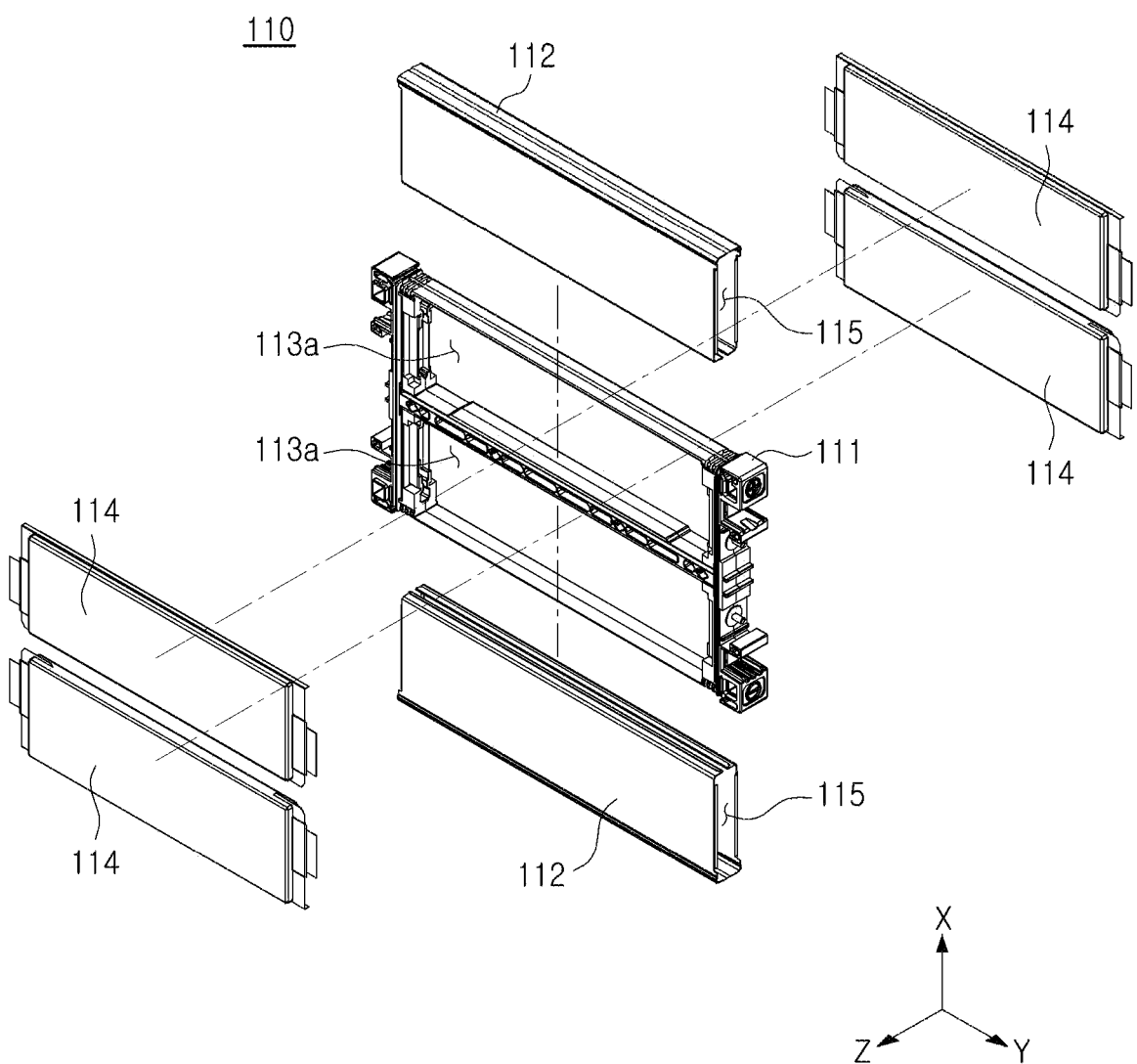
FIG. 4 is an exploded perspective view of a battery sub-module according to an exemplary embodiment.
Figure 5:
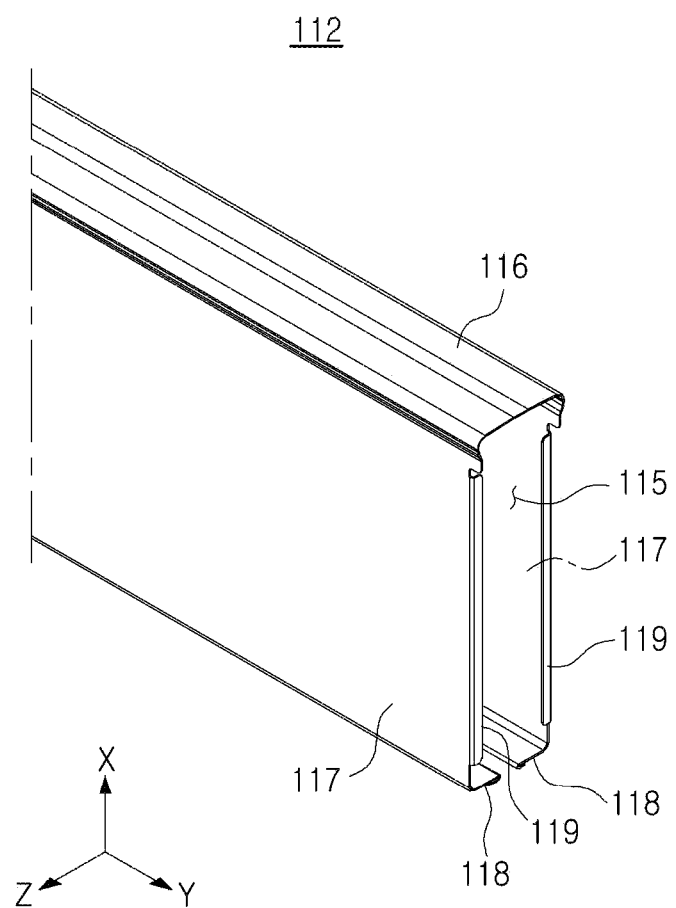
FIG. 5 is a perspective view of a case according to an exemplary embodiment.
Figure 6:
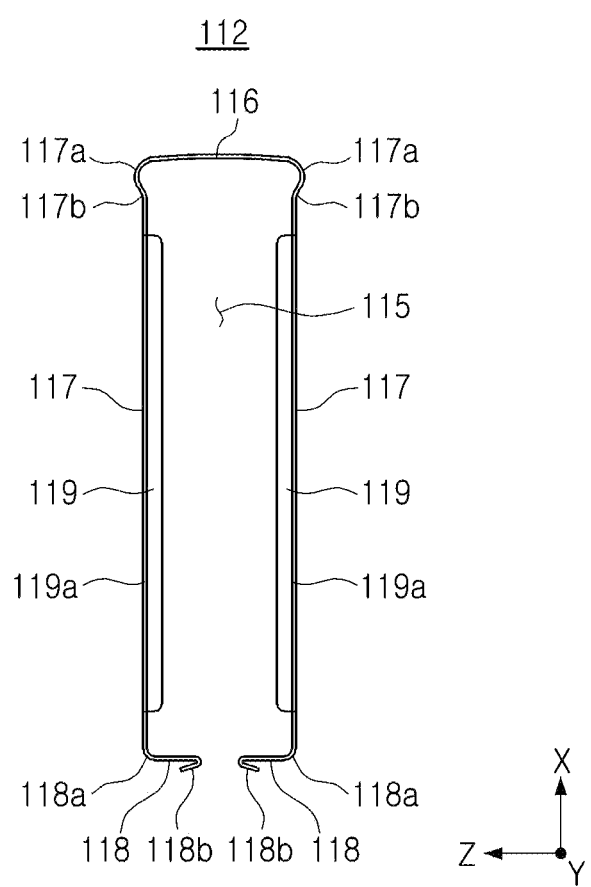
FIG. 6 is a side view of a case according to an exemplary embodiment.

FIG. 3 is a perspective view of the battery sub-module 110 according to an exemplary embodiment. FIG. 4 is an exploded perspective view of the battery sub-module 110 according to an exemplary embodiment. FIG. 5 is a perspective view of a case according to an exemplary embodiment. FIG. 6 is a side view of a case according to an exemplary embodiment.

In an exemplary embodiment, the battery sub-module 110 may include a cell support member 111, a battery cell 114, and a case 112.

The battery cell 114 may include an electrode assembly and a cell body member surrounding the electrode assembly. The electrode assembly substantially includes an electrolyte for use in the cell body member. In one embodiment, the electrolyte may be in a liquid, solid or gel phase. For example, the electrolyte may include lithium salts such as $LiPF_6$ and $LiBF_4$ in organic solvents such as ethylene carbonate (EC), propylene carbonate (PC), diethyl carbonate (DEC), ethyl methyl carbonate (EMC), and dimethyl carbonate (DMC).

In another embodiment, the cell body member is configured to protect the electrode assembly from an external impact. The cell body member may be a pouch-shaped member or a can-shaped member. In one embodiment, the pouch-type member seals and accommodates the electrode assembly from three sides. That is the pouch-type member seals and accommodates an upper side and both side surface portions, except for one surface which is mainly a lower surface. The upper side and both side surface portions may be folded and bonded to seal the electrode assembly in the state in which the electrode assembly is accommodated in the cell body member. In one embodiment, the can-shaped member seals and accommodates the electrode assembly on one side. That is the can-shaped member seals and accommodates only one side of an upper surface portion, (not a lower surface portion or both side surface portions). The one side if the upper surface portion is folded and bonded to seal the electrode assembly in a state in which the electrode assembly is accommodated therein.

In another embodiment, at least one battery cell 114 may be accommodated in the cell support member 111. For example, the cell support member 111 may have a quadrangular frame shape surrounding a side portion (or an edge) of at least one battery cell 114, and the battery cell 114 may be accommodated in the quadrangular frame. In the illustrated embodiment shown in FIG. 4, the cell support member 111 may include two spaces 113a divided from each other vertically, and a pair of battery cells 114 may be accommodated in each of spaces 113a. The pair of battery cells 114 accommodated in one of the spaces 113a may be in close contact with each other.

In one embodiment, the case 112 is configured to surround at least portions of the battery cells 114. For example, when the battery cells 114 are accommodated in the cell support member 111, both surfaces of the battery cells 114 may be exposed externally and the case 112 may surround the exposed portions of the battery cells 114. For example, the case 112 may be provided in a C-shape to cover both surfaces of the battery cell 114 from both sides. 'The case 112 covering both surfaces of the battery cell 114' may be understood as a concept covering both surfaces exposed externally in a pair of battery cells 114 in close contact with each other.

In another embodiment, the structure of the cell support member 111 or the number of battery cells 114 accommodated in the cell support member 111 may be provided to be different from the illustrated embodiments shown in the drawings. For example, one cell support member 111 may include more than two battery cells 114.

In another embodiment, after the battery cell 114 is accommodated in the cell support member 111, the case 112 may cover both sides of the battery cells 114. In one embodiment, the case 112 may guide a flame or gas (occurring when a fire occurs in the battery cell 114) to a flame ejection portion 111a. For example, the flame ejection portion 111a may be disposed on side surfaces of the cell support member 111 as shown in FIG. 3. For example, the case 112 may be configured to cover both surfaces of the battery cell 114 (or the pair of battery cells 114). Also, the cell support member 111 may include the flame ejection portion 111a in a portion corresponding to a portion not covered by the case 112. In this case, the gas or flame occurring in the battery cell 114 may be guided to the flame ejection portion 111a.

In another embodiment, the flame ejection portion 111a may be in the form of a hole. However, the present disclosure is not limited thereto, and any component that may guide a flame to the outside of the battery sub-module 110 may comprise a flame ejection portion 111a of the present disclosure. In one embodiment, by limiting a size of the flame ejection portion 111a, an effect of guiding the flame to the outside and suffocating the generated flame may also be obtained.

In another embodiment, the case 112 may comprise a metal material to prevent flame propagation of the battery cell 114. The case 112 may be formed of, for example, iron (Fe) having a thickness of at least 0.45 mm or aluminum (Al) having a thickness of at least 0.8 mm. As another example, the case 112 may be formed of a single metal material or an alloy material that maintains a shape thereof up to at least 80012. That is, a material of the case 112 is not limited to iron or aluminum, and any material may be used as a material of the case 112 as long as the material is a metal material maintaining a shape thereof at 800° ° C. or it is an alloy material obtained by mixing a plurality of metals.

In one embodiment, the case 112 may comprise a metal material, and thus may also dissipate heat generated in the battery cell 114 to the outside. In another embodiment, the case 112 may be configured to absorb heat generated by the battery cell 114 and dissipate the absorbed heat to the outside of the battery sub-module 10.

In still another embodiment, the case 112 may be configured to press the surfaces of the battery cells 114 together in the stacking direction. For example, the pouch-shaped battery cell 114 may be formed by stacking positive and negative plates in one direction, and the case 112 may press the electrode plates inside the battery cell 114 in a mutually compressed direction in the stacking direction.

In still another embodiment, the case 112 may be fitted into the cell support member 111 so that the battery cells 114 are positioned in the inner space 115 defined by the case 112. For example, the case 112 may be provided in a C-shape to surround the battery cells 114 from both sides. In one embodiment as illustrated in FIG. 5, the case 112 may include an upper plate 116 and side plates 117 extending parallel to each other from both ends of the upper plate 116.

In another embodiment, the case 112 may include a bent portion extending from the edge of the side plate 117 toward the inner space 115. In one embodiment, a first bent portion 118 may extend inwardly of the battery sub-module 110 from the edge of the longitudinal direction (i.e., the X direction) of the side plate 117.). For example, the first bent portion 118 may extend to the inner space 115 defined by the case 112 or in a direction toward the opposite side plate 117. For example, the first bent portion 118 may extend inwardly of the battery sub-module 110 to have an angle of approximately 90 degrees with the side plate 117.

In another embodiment, a second bent portion 119 may extend inwardly of the battery sub-module 110 from the edge of the width direction (i.e., the Y direction) the side plate 117. For example, the second bent portion 119 may extend to the inner space 115 defined by the case 112 or in a direction toward the opposite side plate 117. For example, the second bent portion 119 may extend inwardly of the battery sub-module 110 to have an angle of approximately 90 degrees with the side plate 117.

In still another embodiment, the case 112 may include a third bent portion 118b (as shown in FIG. 6) extending outward from the edge of the first bent portion 118. The first bent portion 118 and the third bent portion 118b may form an acute angle.

In one embodiment, the side plate 117 may include a convex portion 117a and a concave portion 117b (as shown in FIG. 6) at a portion connected to the upper plate 116.

Figure 7:
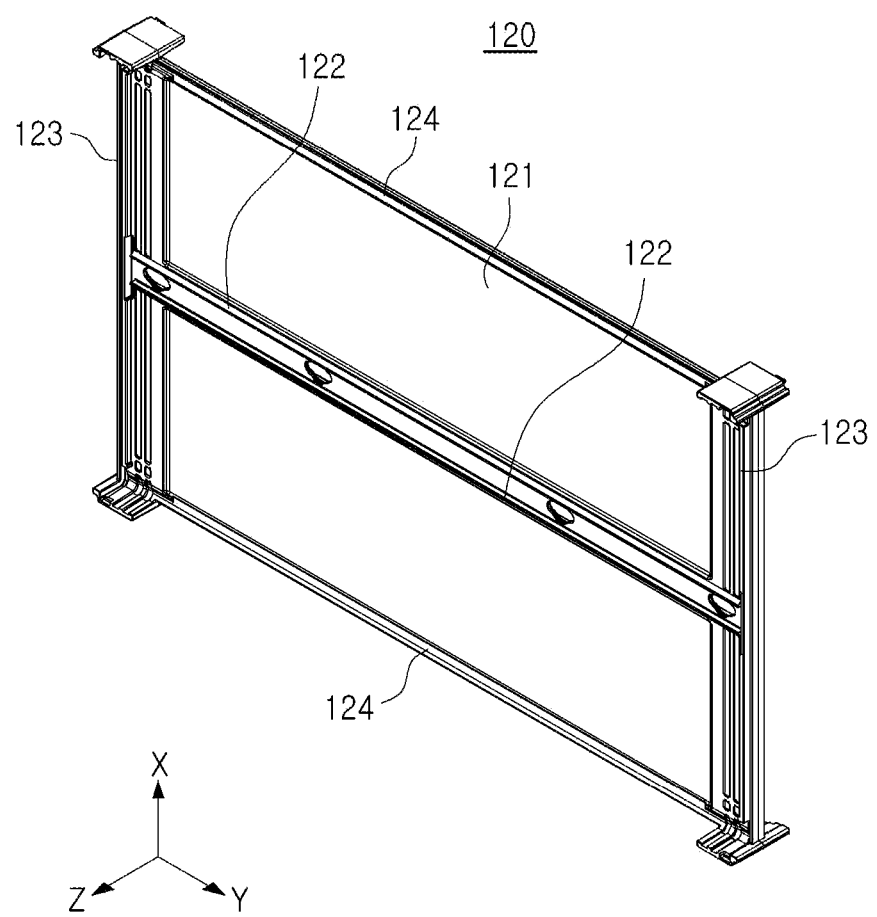
FIG. 7 is a perspective view of a first barrier according to an exemplary embodiment.
Figure 8:
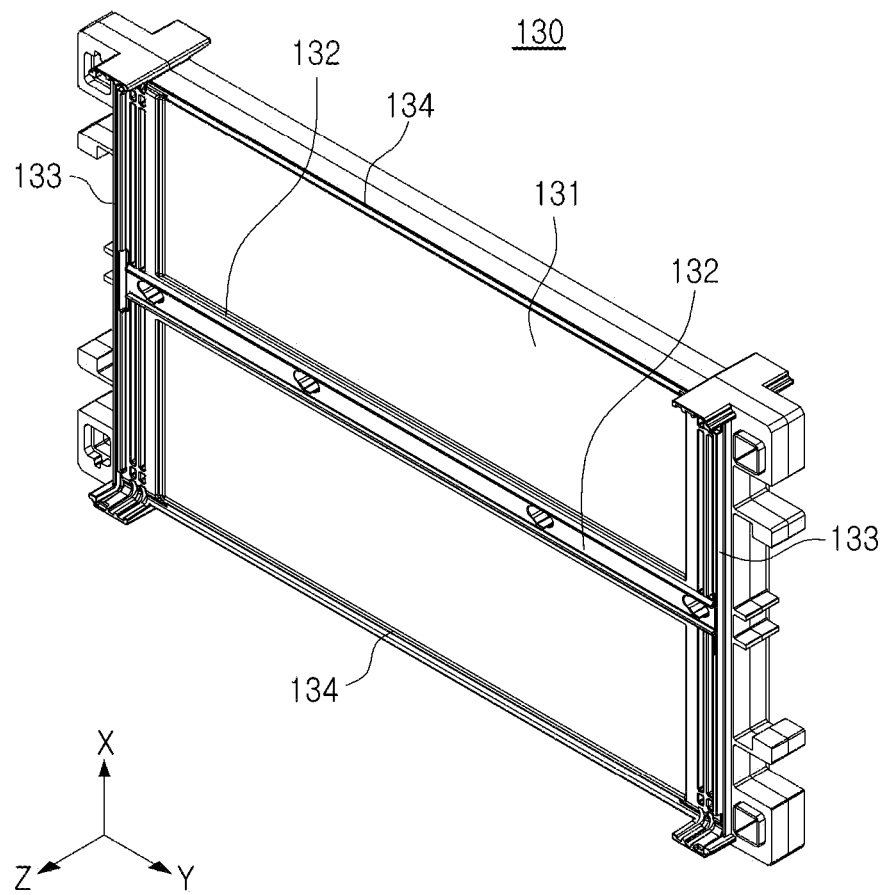
FIG. 8 is a perspective view of a second barrier according to an exemplary embodiment.
Figure 9:
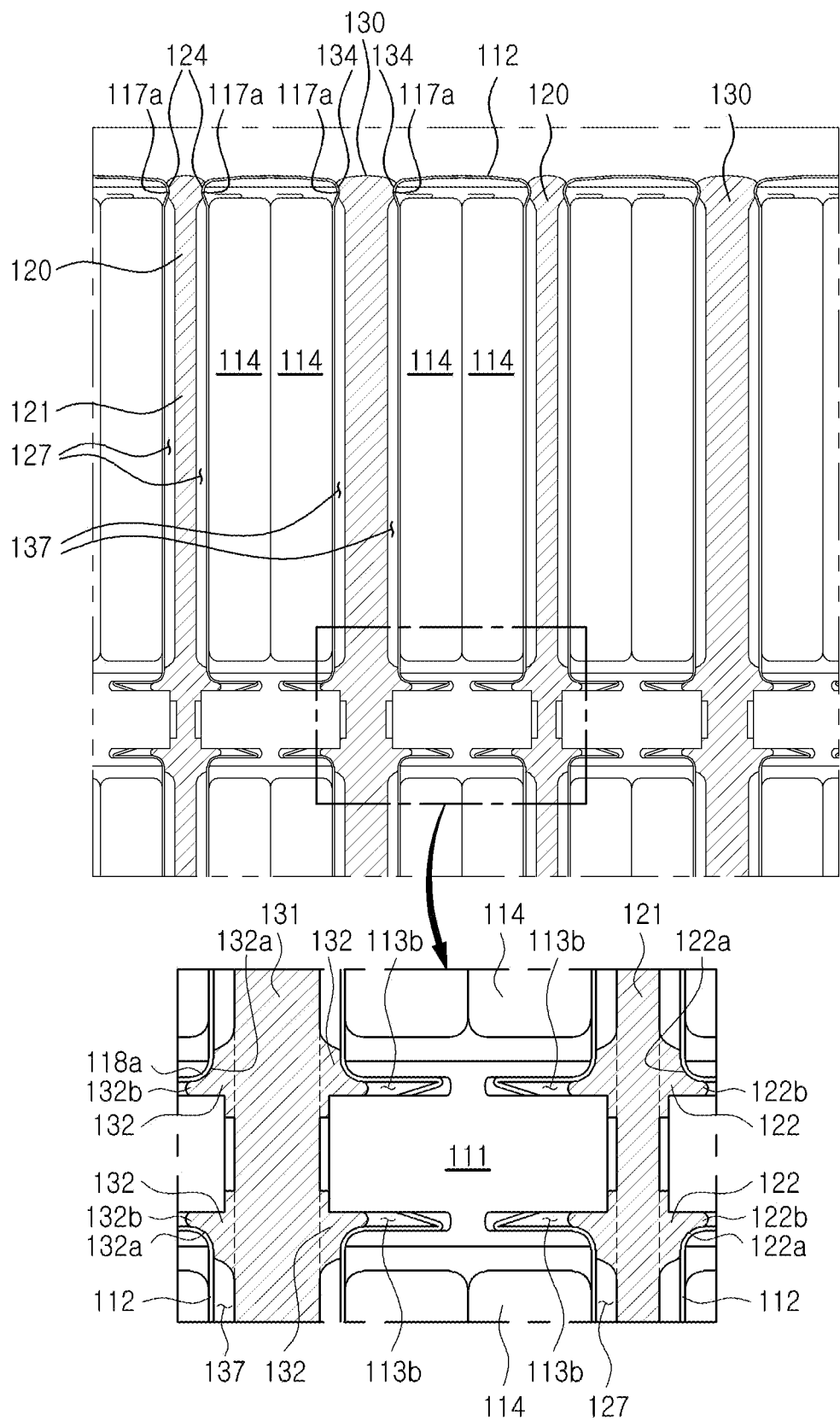
FIG. 9 is a cross-sectional view taken along line I-I' of FIG. 1.
Figure 10:
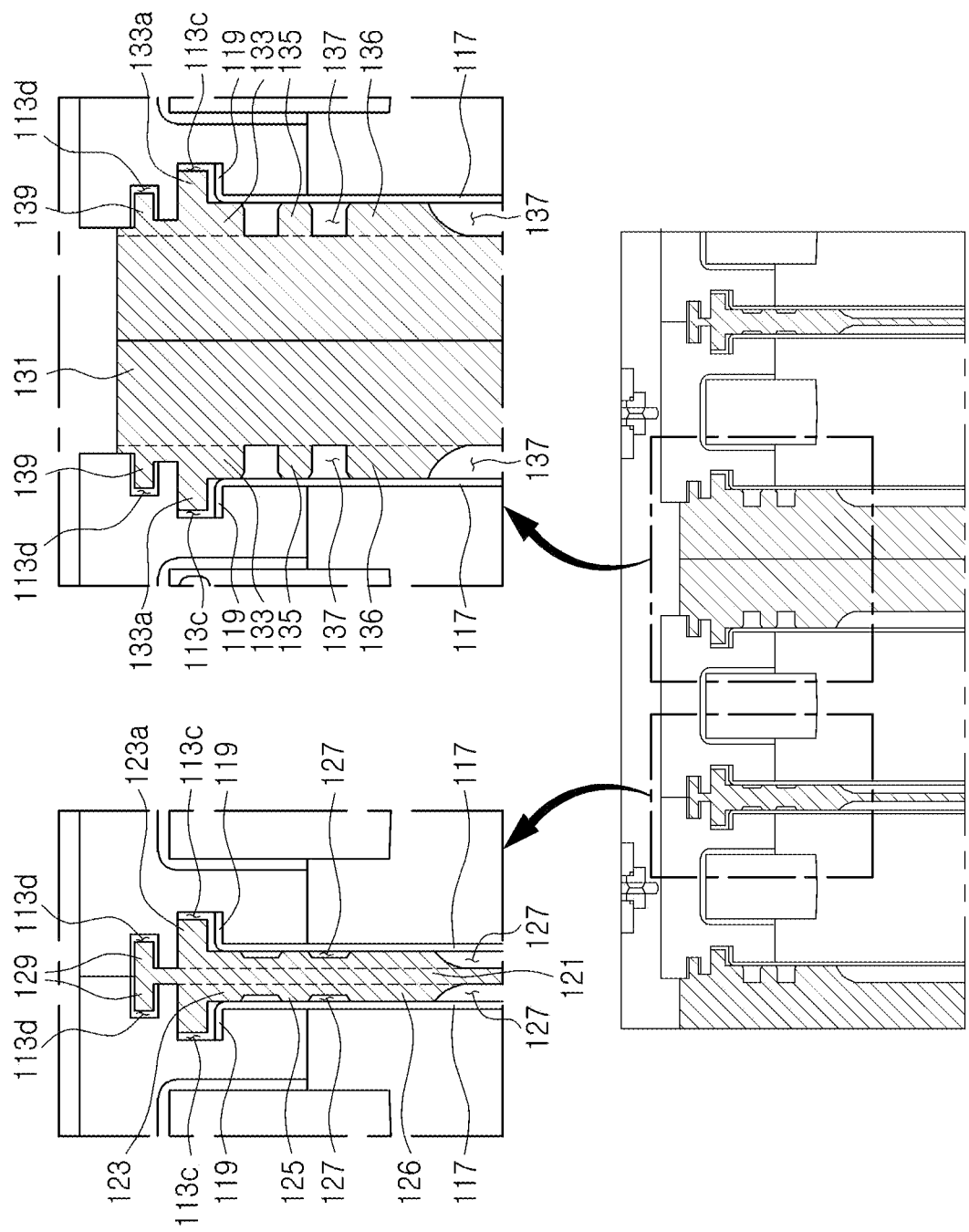
FIG. 10 is a cross-sectional view taken along line II-II' of FIG. 1.

FIG. 7 is a perspective view of the first barrier 120 according to an exemplary embodiment. FIG. 8 is a perspective view of the second barrier 130 according to an exemplary embodiment. FIG. 9 is a cross-sectional view taken along line I-I' of FIG. 1. FIG. 10 is a cross-sectional view taken along line II-II' of FIG. 1.

In one embodiment, the case 112 may be fitted to the cell support member 111. In another embodiment, the bent portion of the case 112 may be partially accommodated in a recess portion of the cell support member 111 to be fixed to the cell support member 111.

Referring to FIG. 9, in the illustrated embodiment, the cell support member 111 may include a first recess portion 113b in which the first bent portion 118 may be partially accommodated. In one embodiment, the first recess portion 113b may be depressed in a direction (Z direction) in which the first bent portion 118 extends. When the first bent portion 118 is fitted into the first recess portion 113b, the case 112 may be prevented from being separated from the cell support member 111 in the X direction.

Referring to FIG. 10, in the illustrated embodiment, the cell support member 111 may include a second recess portion 113c in which the second bent portion 119 may be partially accommodated. In one embodiment, the second recess portion 113c may be depressed in a direction (Z direction) in which the second bent portion 119 extends. When the second bent portion 119 is fitted into the second recess portion 113c, the case 112 may be prevented from being separated from the cell support member 111 in the Y direction.

Meanwhile, as the second bent portion 119 is coupled to the second recess portion 113c, the case 112 may be fitted into the cell support member 111, but the side plate 117 cannot be prevented from being separated from the cell support member 111 in the Z direction.

In still another embodiment, the barriers 120 and 130 may press part or all of both sides of the battery sub-module 110, which may prevent the side plates 117 from being opened to the both sides. The barriers 120 and 130 may prevent flame transfer or heat transfer. The barriers 120 and 130 may be provided between adjacent battery sub-modules 110 to prevent flame propagation or heat transfer between different battery sub-modules 110.

The barriers 120 and 130 may themselves act as protective walls between the battery sub-modules 110 adjacent to each other, thereby preventing flame or heat transfer between the battery sub-modules 110 provided on both sides. In one embodiment, the barriers 120 and 130 may comprise a thermosetting polymer material that maintains its shape up to at least 800° C., a polyphenylene sulfide material, or a material containing at least plaster. The material of the barriers 120 and 130 may secure fire resistance to prevent a problem that a flame or gas occurring in one battery sub-module 110 is in direct contact with another battery sub-module 110.

In one embodiment, as shown in FIGS. 7 and 8, the barriers 120 and 130 may include bases 121 and 131 and portions protruding from the bases 121 and 131 in the stacking direction (i.e., the Z direction) (hereinafter, referred to as "protrusions 122, 123, 132, and 133" and shown for example in FIGS. 9 and 10). When the barriers 120 and 130 are provided between the battery sub-modules 110, the bases 121 and 131 are disposed to face the side plate 117 of the battery sub-module 110.

In one embodiment, an air gap may be formed between adjacent battery sub-modules 110 due to the barriers 120 and 130. Referring to FIG. 9 or 10, the barriers 120 and 130 only partially contact the battery sub-modules 110 provided on both sides, and air gaps 127 and 137 exist between the barriers 120 and 130 and the case 112. For example, the protrusions 122, 123, 132, and 133 of the barriers 120 and 130 are in contact with the case 112 provided on both sides, and other portions (e.g., portions of the bases 121 and 131) are not in direct contact with the case 112. That is, the air gaps 127 and 137 may be formed between the bases 121 and 131 and the case 112. The air gaps 127 and 137 formed between the battery sub-modules 110 may reduce a rate at which heat is conducted or radiated to a neighboring battery sub-module 110 even if a fire occurs in one battery sub-module 110.

In one embodiment, the protrusion 122, 123, 132, and 133 are provided to prevent an issue in which the case 112 comes into contact with the bases 121 and 131 as the battery cell 114 disposed inside the case 112 swells. That is, when the battery cell 114 is swollen, the case 112 is also pushed in the direction of the bases 121 and 131, and here, the case 112 is prevented from coming into contact with the bases 121 and 131 due to the presence of the protrusions 122, 123, 132, and 133 and thereby forming the air gaps 127 and 137. Accordingly, it is possible to prevent an increase in heat conduction as a contact area between the case 112 and the bases 121 and 131 increases.

In another embodiment, when the protrusions 122, 123, 132, and 133 are disposed between the neighboring cases 112, they may be provided in contact with the case 112 or may be arranged slightly apart from the case 112.

In still another embodiment, the protrusions 122, 123, 132, and 133 may be configured to press a portion of the battery sub-module 110 inwardly of the battery sub-module 110. In one embodiment, the protrusions 122, 123, 132, and 133 may help prevent the case 112 from being separated from the cell support member 111 by pressing against a portion of the case 112 for example press against some of the peripheral edges of the case 112.

That is, the protrusions 122, 123, 132, and 133 may also serve to press the case 112 to be in close contact with the cell support member 111. Additionally, as shown in the top of FIG. 9, an upper part 124 of the first barrier 120 and an upper part 134 of the second barrier 130 press against convex portion 117a of case 112 and serve to hold case 112 in place. Furthermore, the case 112 of the battery sub-module 110 serves to guide a flame, gas, etc. to the side of the battery sub-module 110 in a fire situation. When the battery cell 114 expands in a battery fire situation, etc., the case 112 surrounding the battery cell 114 on both sides may be opened, and in this case, the flame or gas may propagate in an unexpected direction and the fire may be relatively easily transferred to the neighboring battery sub-module 110. Accordingly, in one embodiment, the battery module 100 may include the barriers 120 and 130 including the protrusions 122, 123, 132, and 133 so that the case 112 press the battery cells 114 even in a fire situation. To this end, the protrusions 122, 123, 132, and 133 may be provided to be in point or line in contact with the case 112.

As described above with reference to FIG. 1, the battery sub-modules 110 and the barriers 120 and 130 are pressed to each other in the stacking direction. When the barriers 120 and 130 and the battery sub-module 110 are pressed in a direction toward each other in a state in which portions of the barriers 120 and 130 are in contact with the case 112, the barriers 120 and 130 may press the case 112 inwardly of the battery sub-module 110, which may contribute to more firmly pressing both sides of the battery cell 114 by the case 112.

In another embodiment, the barriers 120 and 130 may be configured to press the edge of the case 112. That is, the barriers 120 and 130 may press the case 112 inwardly of the battery sub-module 110 along the edge of the case 112 (for example press along a peripheral edge section of case 112).

In one embodiment, the case 112 may include a bent portion extending to the inside of the battery sub-module 110, and the protrusions 122, 123, 132, and 133 may be configured to press the bent portions 118 and 119 of the case 112 or a portion(s) adjacent to the bent portions 118 and 119.

In another embodiment, the case 112 may include (as detailed above) a lower corner 118a bent from the side plate 117 to the first bent portion 118. The lower corner 118a may extend in the Y direction. The barriers 120 and 130 may include first protrusions 122 and 132 extending in a direction parallel to the lower corner 118a at positions corresponding to the lower corner 118a. When the barriers 120 and 130 are assembled between the battery sub-modules 110, the first protrusions 122 and 132 may at least partially press against the lower corner 118a or a portion adjacent thereto.

In another embodiment, the case 112 may include a side edge 119a bent from the side plate 117 to the second bent portion 119 (see FIG. 6). The side edge 119a may extend in the X direction, and the barriers 120 and 130 may include second protrusions 123 and 133 (see FIGS. 7 and 8) and in this embodiment extending in a direction parallel to the side edge 119a at positions corresponding to the side edges 119a. When the barriers 120 and 130 are assembled with the battery sub-modules 110, the second protrusions 123 and 133 may at least partially press against the side edge 119a or a portion adjacent thereto.

In another embodiment, the protrusions 122, 123, 132, and 133 may have a shape corresponding to a portion extending from the side plate 117 to the bent portions 118 and 119. In one embodiment, the protrusions 122, 123, 132, and 133 may have a shape corresponding to the corner portions 118a and 119a folded from the side plate 117 to the bent portions 118 and 119. Referring to FIG. 9, the lower corner 118a of the case 112 has a rounded shape, and the protrusions 122 and 132 may include recesses 113b and 113c corresponding to the lower corner 118a. When the barriers 120 and 130 are disposed on one side of the battery sub-module 110, the concave portions 122a and 132a of the first protrusions 122 and 132 may be in close contact with the lower corner 118a, which may prevent the case 112 from being opened and separated from the cell support member 111.

In still another embodiment, the protrusions 122, 123, 132, and 133 may be partially accommodated in the recesses 113b and 113c of the cell support member 111 accommodating the bent portions 118 and 119 of the case 112. Referring to FIG. 9, the first protrusions 122 and 132 of the barriers 120 and 130 may include portions 122b and 132b extending to the first recess portion 113b. The corresponding portions 122b and 132b may be partially fitted into the first recess portion 113b to help the case 112 to be fixed to the cell support member 111.

Referring to FIG. 10, the second protrusions 123 and 133 of the barriers 120 and 130 may include portions 123a and 133a extending to the second recess 113c. The corresponding portions 123a and 133a may be partially fitted into the second recess 113c to help the case 112 to be fixed to the cell support member 111.

In one embodiment, the protrusions 122, 123, 132, and 133 are provided symmetrically on both sides of the barriers 120 and 130, and the recesses 113b and 113c partially accommodating the protrusions 122, 123, 132, and 133 may also be provided symmetrically on both sides of the battery sub-module 110. Accordingly, when the plurality of battery sub-modules 110 and the plurality of barriers 120 and 130 are alternately stacked, the protrusions 122, 123, 132, and 133 are fitted into the recesses 113b and 113c, so that the battery sub-modules 110 may be aligned with each other. That is, the first protrusions 122 and 132 and the first recess portion 113b may assist in alignment of the battery sub-modules 110 in a height direction (the X direction). In addition, the second protrusions 123 and 133 and the second recess 113c may assist in alignment of the battery sub-modules 110 in a width direction (the Y direction).

In one embodiment, the barriers 120 and 130 may include additional protrusions in addition to the first protrusions 122 and 132 and the second protrusions 123 and 133. For example, referring to FIG. 10, the barriers 120 and 130 may include additional protrusions 125, 126, 129, 135, 136, and 139 near the second protrusions 123 and 133.

In another embodiment, the bases 121 and 131 may be formed as bellows to elastically absorb high-pressure energy caused by an explosion occurring in one battery sub-module 110, thereby reducing an influence of the explosion on the other battery sub-module adjacent thereto.

In other words, when a high-pressure gas presses the bases 121 and 131, the bellows-shaped bases 121 and 131 are elastically deformed to a flat shape to absorb kinetic energy of high pressure as strain energy. Accordingly, the influence of explosive energy occurring in one battery sub-module 110 on the other neighboring battery sub-module 110 may be reduced.

Figure 11:
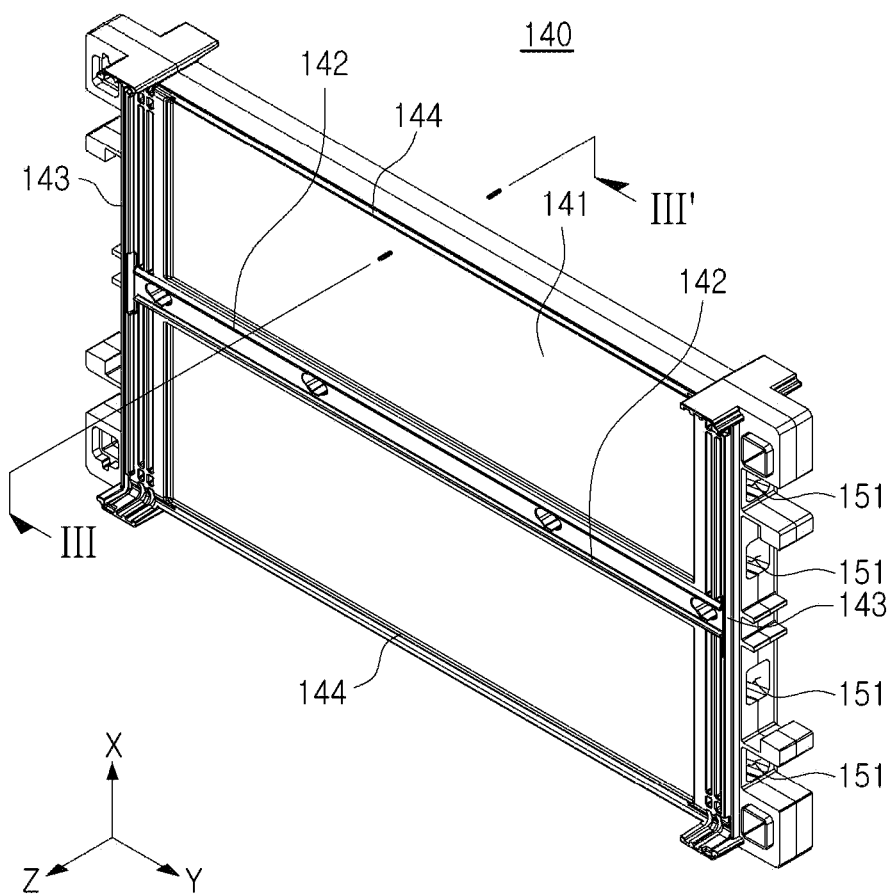
FIG. 11 is a perspective view of a barrier including an air gap therein according to an exemplary embodiment.

FIG. 11 is a perspective view of a barrier 140 (e.g., the first barrier 120 or the second barrier 130 of FIG. 1) including an air gap 153 therein according to an exemplary embodiment.

Figure 12:
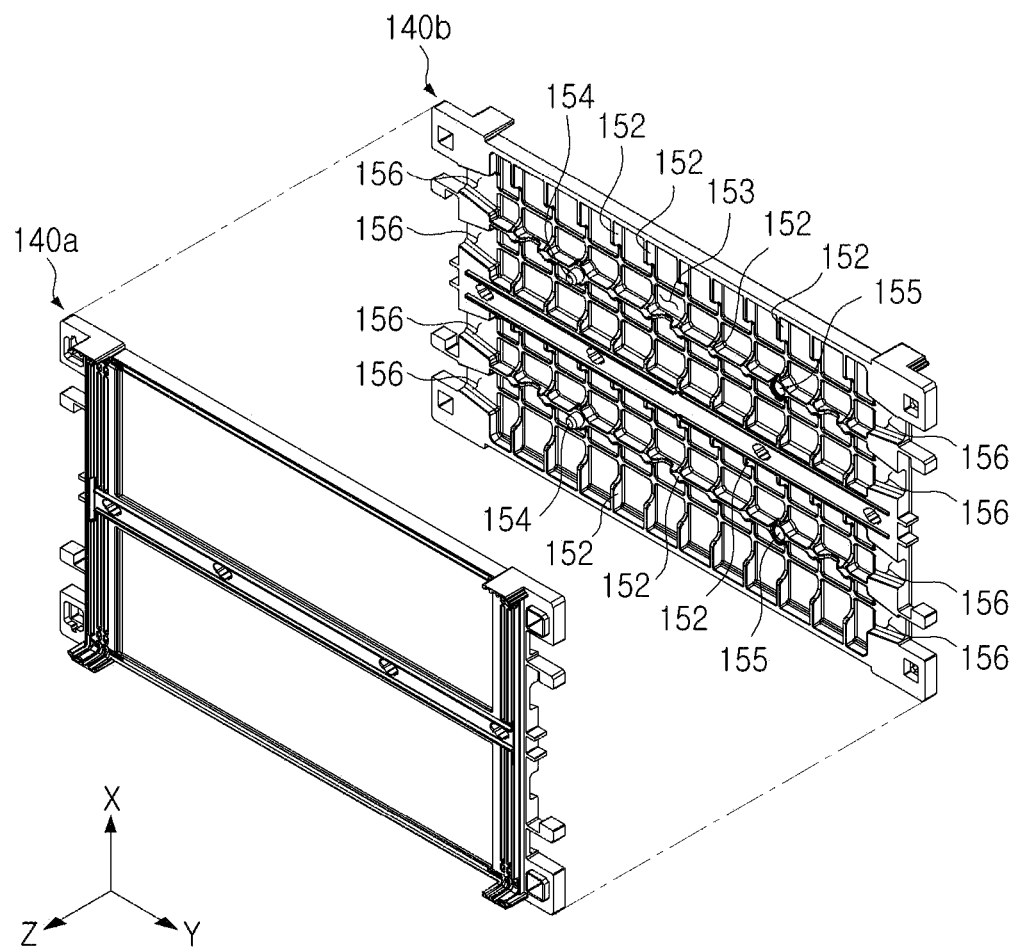
FIG. 12 is an exploded perspective view of the barrier of FIG. 11.
Figure 13:
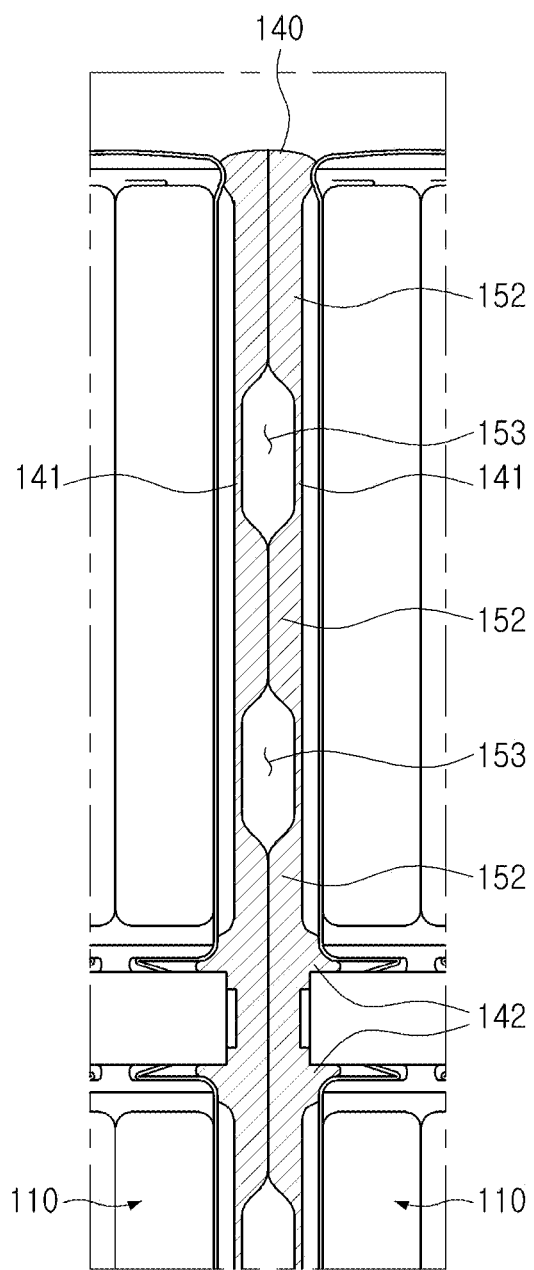
FIG. 13 is a cross-sectional view taken along line of III-III' of FIG. 11.

FIG. 12 is an exploded perspective view of the barrier 140 of FIG. 11. FIG. 13 is a cross-sectional view taken along line III-III' of FIG. 11.

In the embodiment shown, the barrier 140 may include an air gap 153 therein. In one embodiment, the barrier 140 may include a partition wall 152 therein, and the air gap 153 may be formed in the barrier 140 by the partition walls 152. Referring to FIG. 13, the barrier 140 may include the partition wall 152 extending in a thickness direction therein, and a portion excluding the partition wall 152 may act as the air gap 153. In one embodiment, the partition wall 152 may include an opening connecting both spaces divided by the partition wall 152.

In another embodiment, the barrier 140 may include at least one opening 151 connected to the internal air gap 153 on an outer surface. In the illustrated embodiment of FIG.

11, four openings 151 are provided on each of both sides of the battery sub-module 110. The internal air gap 153 of the barrier 140 may be connected to the outside of the barrier 140 through the opening 151, which may contribute to reduction of heat conduction between the battery sub-modules 110 provided on both sides of the barrier 140.

Referring to FIG. 12, in one embodiment, the barrier 140 may be formed by combining two pieces 140a and 140b. One barrier 140 may be formed by combining a first piece 140a and a second piece 140b with each other. The two pieces 140a and 140b may be attached together by coupling a fastening protrusion 154 and a fastening recess 155 provided therein. For example, in the illustrated embodiment, the second piece 140b includes two fastening protrusions 154 on one side and two fastening recesses 155 on the other side. The first piece 140a facing the second piece 140b may include a fastening recess 155 and a fastening protrusion 154 respectively corresponding to the fastening protrusion 154 and the fastening recess 155 of the second piece 140b.

In this illustrated embodiment, each of the pieces 140a and 140b may include partition walls 152 extending in a thickness direction therein. When the two pieces 140a and 140b are combined, the partition walls 152 provided in each of the pieces 140a and 140b may come into contact with each other to form one partition wall 152. Referring to FIG. 13, as the partition walls 152 are in contact with each other, the barrier 140 may withstand a compressive force in the thickness direction. In one embodiment, the air gap 153 corresponding to a portion in which the partition wall 152 is not present exists inside the barrier 140.

In another embodiment, each of the pieces 140a and 140b may include a recess 156 depressed in the thickness direction at an edge portion, and when the two pieces 140a and 140b are coupled, two recesses 156 provided in each of the pieces 140a and 140b may join to form a single opening 151 at that position.

In one embodiment, the air gap 153 provided inside the barrier may be connected to at least one opening 151 provided on the outer surface.

In the embodiments described above with reference to FIGS. 1 to 10, the second barrier 130 is configured to be thicker than the first barrier 120, and thus the second barrier 130 may further include the air gap 153, the opening 151, or a structure (e.g., the partition wall 152, the recess 156, etc.) forming these components described above with reference to FIGS. 11 to 13 therein.

As set forth above, the battery module according to one embodiment in the present disclosure is configured to prevent fire propagation between battery sub-modules. Specifically, the battery module includes a structure effectively sealing a plurality of battery sub-modules provided therein, and the corresponding structure may prevent a fire occurring in a specific battery sub-module from propagating to another battery sub-module.

While example exemplary embodiments have been illustrated and described above, it will be apparent to those skilled in the art that modifications and variations could be made without departing from the scope of the present disclosure as defined by the appended claims.

What is claimed is:

1. A battery module comprising:
a battery sub-module including a cell support member, at least one battery cell accommodated in the cell support member, and a case provided to partially surround the at least one battery cell; and
a first barrier disposed on a first side of the battery sub-module,
wherein the at least one battery cell is enclosed and sealed by the cell support member and the case, and
the first barrier includes a first protrusion configured to press a part of the case inwardly of the battery sub-module,
wherein an edge of the case includes a bent portion extending inwardly of the battery sub-module, and the first protrusion of the first barrier is configured to press against the bent portion of the case in a stacking direction,
wherein the case includes an upper plate and side plates extending from both sides of the upper plate, the at least one battery cell is disposed in a space defined by the upper plate and the side plates, and the bent portion of the case extends from an edge of the side plate inwardly of the battery sub-module, and
wherein the cell support member includes a recess partially accommodating the bent portion of the case.

2. The battery module of claim 1, wherein the first protrusion of the first barrier extends along a corner portion of the case bent from the side plate to the bent portion and is configured to press against the bent portion of the case along the corner portion.

3. The battery module of claim 1, wherein the first protrusion of the first barrier has a shape corresponding to a side portion of one of the side plates extending from the side plate to the bent portion.

4. The battery module of claim 1, wherein the first protrusion of the first barrier includes a concave portion having a shape corresponding to a corner portion of the case folded from one of the side plates to the bent portion.

5. The battery module of claim 1, wherein the side plates extend in a length direction to surround the at least one battery cell from both sides of the upper plate, and the bent portion of the case extends inwardly of the battery sub-module from an edge of one of the side plates in the length direction.

6. The battery module of claim 1, wherein the side plates extend in a length direction to surround the at least one battery cell from both sides of the upper plate, and the bent portion of the case extends inwardly of the battery cell from an edge of one of the side plates in a width direction, which is perpendicular to the length direction.

7. The battery module of claim 1, wherein the first protrusion of the first barrier is partially accommodated in the recess.

8. The battery module of claim 1, wherein the first barrier includes an air gap therein.

9. The battery module of claim 8, wherein the first barrier includes at least one opening connected to the air gap on an outer surface thereof.

10. The battery module of claim 8, wherein the first barrier includes a partition wall therein, the air gap is provided inside the first barrier by the partition wall, and the partition wall includes an opening connecting both spaces divided by the partition wall.

11. The battery module of claim 1, wherein the case is configured to press a first side and a second side of the at least one battery cell when assembled to the at least one battery cell, wherein the first side opposes the second side in the stacking direction.

12. The battery module of claim 1, further comprising a second barrier provided on a second side of the battery sub-module, having a wider width than the first barrier to minimize heat conduction or radiation to a neighboring battery sub-module, and including a second protrusion configured to press the case inwardly of the battery sub-module.

13. The battery module of claim 12, wherein the second barrier includes an air gap therein and includes at least one opening connected to the air gap on an outer surface thereof.

14. The battery module of claim 1, wherein the cell support member comprises a quadrangular frame surrounding an edge of the at least one battery cell, a first side and a second side opposing the first side of the at least one battery cell perpendicular to the edge of the at least one battery cell are exposed to an outside of the cell support member, and the case surrounds the first side and the second side of the at least one battery cell.

15. The battery module of claim 1, wherein the case comprises a metal material to absorb heat generated by the at least one battery cell and dissipate the absorbed heat outside the battery sub-module.

16. A battery module comprising:
a battery sub-module including a cell support member, at least one battery cell accommodated in the cell support member, and a case provided to partially surround the at least one battery cell; and
a first barrier and a second barrier having protrusions pressed against the case and the cell support member to hold the at least one battery cell in the battery sub-module, wherein
a gap is formed between the case and at least one of the first barrier and the second barrier,
and
a gas passage is formed from the gap to an outer surface of the battery module,
wherein an edge of the case includes a bent portion extending inwardly of the battery sub-module, and the protrusions of the first barrier and the second barrier are configured to press against the bent portion of the case in a stacking direction,
wherein the case includes an upper plate and side plates extending from both sides of the upper plate, the at least one battery cell is disposed in a space defined by the upper plate and the side plates, and the bent portion of the case extends from an edge of the side plate inwardly of the battery sub-module, and
wherein the cell support member includes a recess partially accommodating the bent portion of the case.

17. The battery module of claim 16, wherein the protrusions comprise peripheral protrusions pressing against bent portions of the case.

* * * * *